G. S. OGILVIE.
WHEEL FOR MOTOR CARS, &c.
APPLICATION FILED JUNE 28, 1904.
934,416.
Patented Sept. 14, 1909.
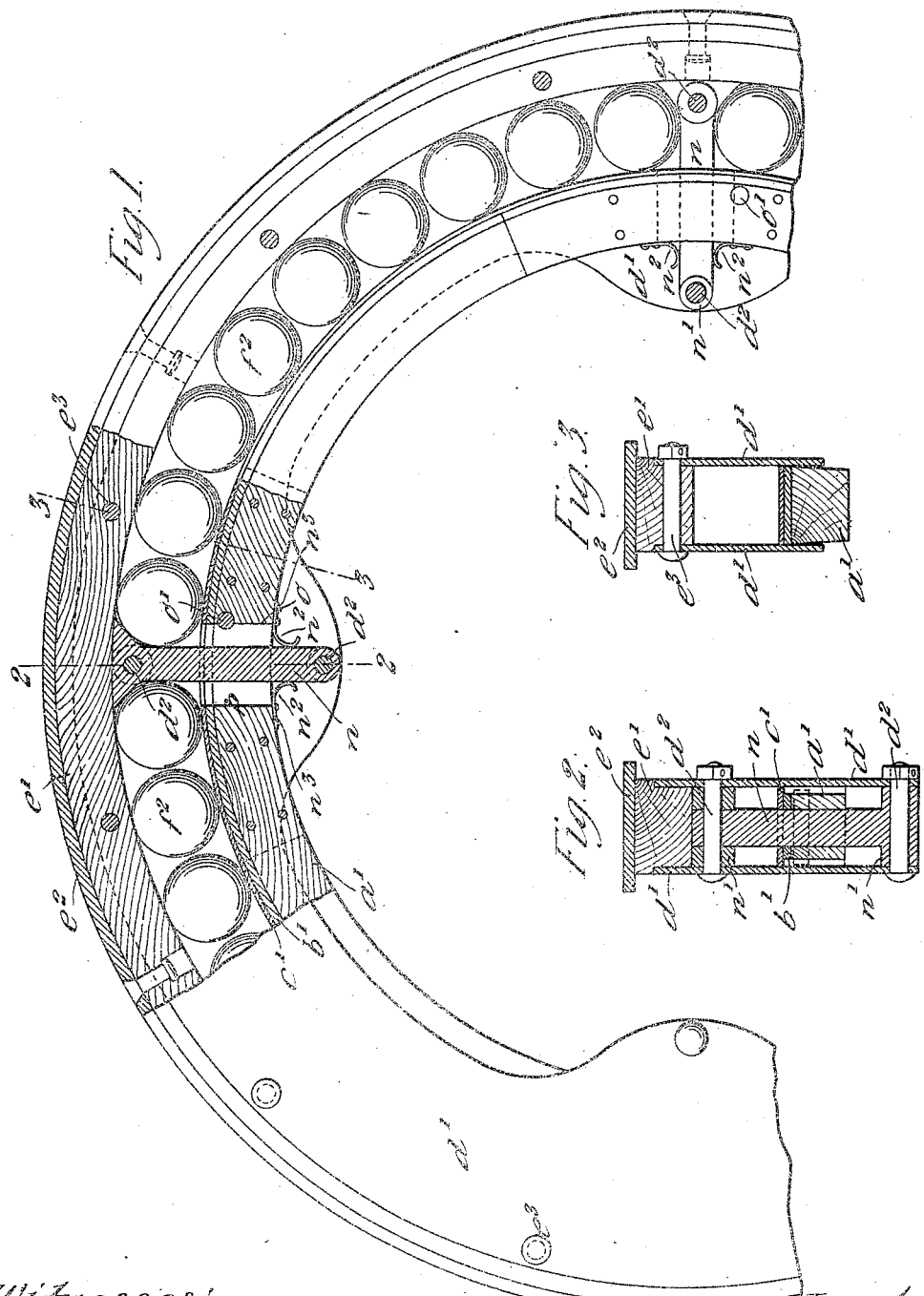

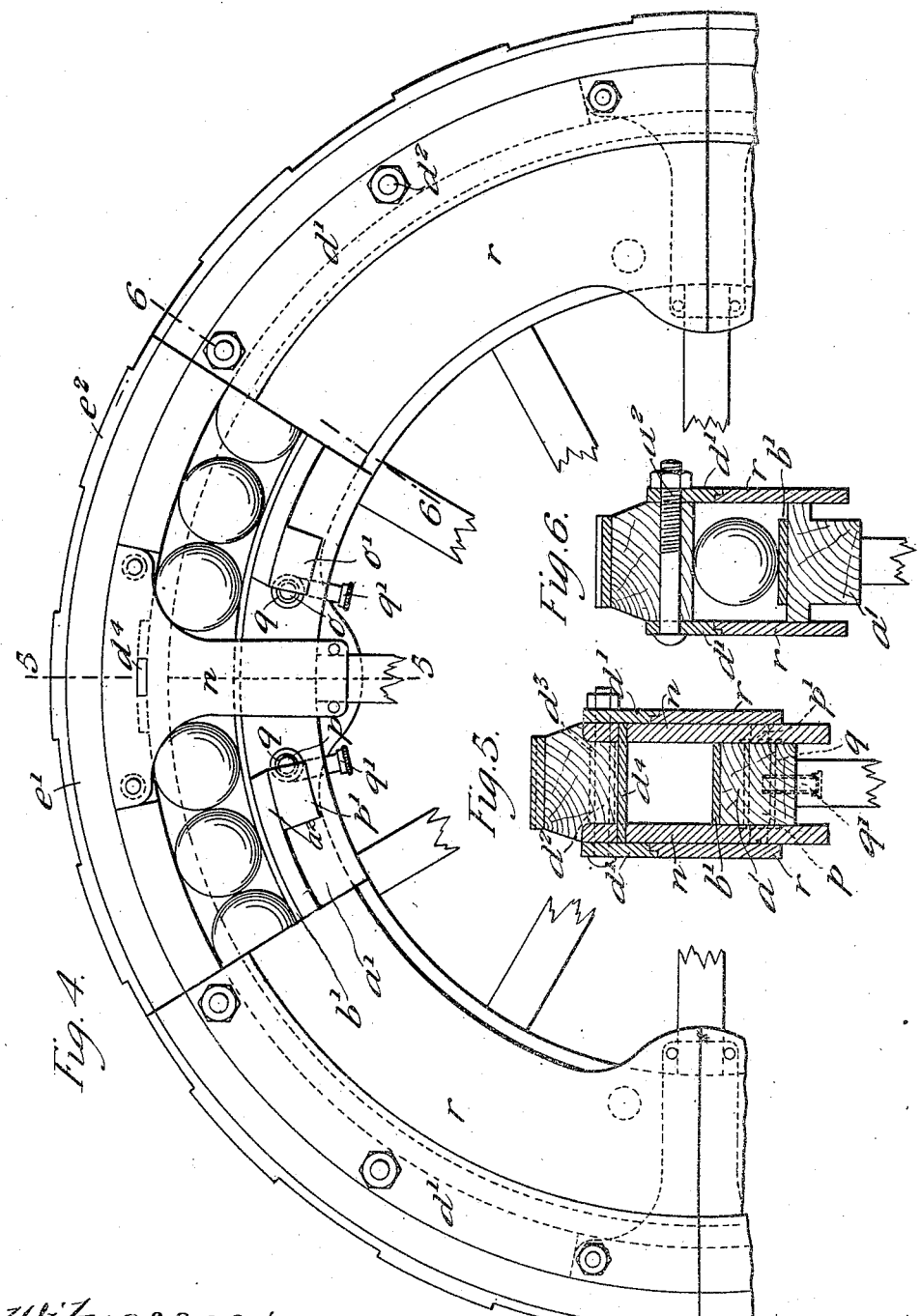

UNITED STATES PATENT OFFICE.

GLENCAIRN STUART OGILVIE, OF WOODBRIDGE, ENGLAND.

WHEEL FOR MOTOR-CARS, &c.

934,416.      Specification of Letters Patent.    Patented Sept. 14, 1909.

Original application filed August 3, 1903, Serial No. 168,094. Divided and this application filed June 28, 1904. Serial No. 214,491.

*To all whom it may concern:*

Be it known that I, GLENCAIRN STUART OGILVIE, a subject of the King of Great Britain and Ireland, residing at The Lodge, Woodbridge, in the county of Suffolk, England, have invented certain new and useful Improvements in Wheels for Motor-Cars and other Vehicles, of which the following is a specification, for which I have obtained patents in Great Britain, No. 631, dated January 9, 1903, and No. 5,764, dated March 12, 1903; in France, dated July 29, 1903, No. 334,248; in Belgium, dated July 29, 1903, No. 171,766, and in Italy, dated September 30, 1903, No. 213, Vol. 176.

This invention relates to improvements in the construction of wheels for motor cars and other vehicles, and was originally included in the application filed August 3rd, 1903, Serial No. 168094, of which this is a division.

The object of the improved construction which constitutes the present invention is to provide a durable tire for such wheels, by the use of which a very considerable resilience is obtained without incurring the danger of punctures which is inseparable from the use of the ordinary pneumatic tire. For this purpose the rim and felly form separate constructions and are correlated for driving purposes in such manner that there is a certain relative freedom of movement both in a radial and in a circumferential direction. The rim is compounded of an outer rim of wood, or other suitable material or materials, and two metal side rings, one on each side of the outer rim to which they are bolted, forming a channel which embraces the felly of the wheel. Between the felly and the outer rim is a suitable resilient medium or device, which may consist of solid or hollow cushions of india-rubber or other elastic material, on which the compound rim floats, the driving being effected by means of a special disposition of stops fixed to or forming part of the rim and felly respectively.

In the accompanying drawings, Figure 1 is an elevation with part of one of the side rings removed of part of a wheel constructed according to the present invention, and Figs. 2 and 3 are sections on lines 2—2, 3—3 respectively of Fig. 1; Fig. 4 is a part sectional elevation of a modified construction in which twin rim-stops or drivers inclosing the felly are employed, Figs. 5 and 6 are sections on lines 5—5 and 6—6 respectively of Fig. 4 the side rings being in position.

Referring first to Figs. 1, 2 and 3, a wooden felly $a'$ which is secured to the wheel hub in any suitable manner, is surmounted by a rim $b'$ of iron or other suitable material, over which is freely mounted a false felly $c'$ which may conveniently consist of a thin steel band formed with or without a number of projections on its outer periphery, between which and a wooden rim $e'$ are interposed elastic cushions $f^2$ which may consist of solid, hollow, or cored balls or rollers of india-rubber. The wooden rim $e'$ is surmounted by an outer rim $e^2$ of suitable section secured by rivets or bolts to the wooden rim. Two side rings $d'$, which may alternatively be built in segments suitably secured to each other, are placed one on each side of the rim $e'$, to which they are secured by bolts and nuts $e^3$. The rim $e'$ and outer rim $e^2$ may be built in corresponding sections as shown in Fig. 4, and each section is arranged to be separately removable to give access to the space occupied by the resilient medium. The rim driving stops consist of a number of bars $n$, four are indicated in the drawings, which are passed from the inner side through slots in the felly $a'$, felly rim $b'$ and loose band $c'$, and are secured to the side rings $d'$ near their inner and outer peripheries by bolts $d^2$, distance pieces $n'$ being inserted on either side of the driving bar. These distance pieces in the case of the inner end of the driving bar may be integral with the latter as shown in Fig. 2. The rings $d'$ are preferably increased in depth in the region of the driving bars and may be cut away on the inside between the driving bars to diminish their weight. Each of the rim driving stops $n$ works between a pair of driving stops on the felly constituted by a slot therein, the rear face $o$ of which being in the case of a driving wheel the forward driver, and the front face $p$ of the slot being the backward driving stop. The forward driving face of the slot is preferably provided with antifriction rollers $o'$ which are mounted in recesses in the face, and the other stops may also be provided with such rollers, or they may be faced with india-rubber, leather or the like, for the purpose of deadening the sound made by the stops as they come into engagement. The slots in the felly are closed on the inner side by spring sheaths $n^2$, which are fastened at one end on the inner periphery of the felly by screws $n^3$ and bear lightly on the front and rear faces of the driving bar $n$, thus excluding dust and stones from the driving slots. When the rim is of wood, this surface would preferably be faced with an iron band.

In the modified construction illustrated in Figs. 4 to 6, each rim driving stop consists of a pair of bars $n$ one on either side of the wood rim $e'$ and secured thereto and to the side rings $d'$ by bolts $d^2$. The driving bars $n$ also inclose the felly and felly band $a'$, $b'$, and work between stops secured thereto and consisting of pins $o$ $p$ passing through the felly and projecting on either side thereof in the path of the twin driver. The beading $a^2$ of the felly and also if necessary the edges of the felly band are cut away between the stops $o$ $p$ forming an external recess of sufficient length and depth to clear the driving bars for all working positions of the latter. The iron side rings $d'$ are for the sake of lightness reduced in depth all the way around so that they only partially inclose the elastic cushions and are supplemented by dust cover rings $r$ of some suitable light material which may be made in segments, as in Fig. 4, and attached to the side rings in any convenient manner. The dust cover rings complete the inclosure of the elastic cushions and of the external recesses in the felly in which the driving bars work. The felly stops $o$ $p$ are preferably revoluble in their housings and for this purpose their projecting ends are of reduced diameter, the shoulders thus formed abutting against cover plates $o'$ $p'$ secured on the outside of the felly, and the bodies of the stops being preferably mounted in metal tubes $q$ passing transversely through the felly. The tubes $q$ are fitted with lubricators $q'$ by which the bearings of the revolving stops may be conveniently lubricated. The ends of the cover plates $o'$ $p'$ are cut away to fit snugly around the rear sides of the revolving stops. The driving bars are held up against the side rings $d'$ by means of distance tubes $d^3$ encircling the bolts $d^2$ and by transverse distance plates $d^4$ having reduced ends which are stepped in correspondingly-shaped holes or slots in the driving bars. The outer rim $e^2$ or tread of the wheel is for heavy cars and rough roads, preferably of iron formed with corrugations or dentations to reduce slipping, but any other suitable tread may be substituted. A loose antifriction band, such as shown in the construction illustrated in Figs. 1 2, and 3, may be interposed between the elastic cushions and the felly rim $b'$ so as to reduce the wear on the elastic cushions due to relative circumferential movement of the felly and rim.

In wheels constructed as herein described, the felly stops are arranged to give a clearance for the circumferential play of the driving bars, which is at least equal to the total radial play between the felly and the rim, so that the wheel cannot become locked until such radial play has been entirely taken up. By means of this special disposition of four sets of driving stops and the relative circumferential and radial freedom of the rim and felly, there will generally, and in fact always, except in the exceptional case in which the rim and felly are momentarily concentric, be only one set of driving stops in operative position in each wheel and this set situated in the forward half of the wheel in the direction of motion in the case of a driving wheel and in the rear half in the case of a trailing wheel, the stops coming into engagement and disengaging at intermediate points between their highest and lowest positions or in the neighborhood of these positions. As a result of this construction also, when the wheel encounters an obstacle, a considerable part of the weight usually borne by the elastic cushions in compression on the underside of the wheel is thrown on the driving stops then in engagement, so that in surmounting the obstacle the actual driving effort is reinforced by a force the moment of which depends on the weight taken by the operating driving stops and the position of these stops at the instant.

Having thus described the nature of my said invention, and the best means I know of carrying the same into practical effect, I claim:—

1. In wheels for road and other vehicles, the combination with a felly rigid with the wheel hub, of a floating rim, an elastic medium interposed between but separate from the said rim and felly, driving bars carried by and projecting inwardly from said rim, and non-elastic stops on the said felly coöperating with the said bars, each bar being interposed with clearance between a pair of stops to allow a limited but absolutely free circumferential movement between said rim and felly, substantially as described.

2. In wheels for road and other vehicles, the combination with a felly rigid with the wheel hub, of a floating rim, elastic cushions interposed between but separate from the said rim and felly, two side rings fixed to the said rim and inclosing said felly, a plurality of twin driving bars rigid with and projecting inwardly from the said rim, one bar on each side of the felly, and pairs of stops on the felly coöperating with the said twin bars for driving purposes, substantially as described.

3. A wheel for road and other vehicles comprising an outer rim, side rings attached thereto, a felly rigid with the wheel hub and adapted to slide between the said rings, elastic rollers between the rim and felly, a plurality of twin driving bars rigid with and projecting inwardly from the said rim, each pair of said bars inclosing the felly within its limbs, and pairs of stops projecting outwardly from each side of the felly, each such pair being arranged to coöperate directly for driving purposes with one of the said twin driving bars, substantially as described.

4. In wheels for road and other vehicles, the combination with a felly rigid with the wheel hub, of an outer rim, an elastic medium interposed between but separate from said felly and rim, a plurality of driving bars carried by the rim and stops on the felly coöperating therewith, the said stops being arranged to allow a limited but absolutely free relative circumferential movement of the rim and felly at least equal to the total radial play due to the interposition of the elastic medium between the rim and felly, substantially as and for the purpose set forth.

In testimony whereof I have signed my name to this specification in the presence of two subscribing witnesses.

GLENCAIRN STUART OGILVIE.

Witnesses:
R. SMITH,
JOSEPH MILLARD.